March 30, 1948.  G. V. WOODLING  2,438,530
COUPLING MEMBER
Filed Jan. 25, 1945

INVENTOR.
George V. Woodling.

Patented Mar. 30, 1948

2,438,530

UNITED STATES PATENT OFFICE 2,438,530

COUPLING MEMBER

George V. Woodling, Cleveland, Ohio

Application January 25, 1945, Serial No. 574,468

6 Claims. (Cl. 285—97.5)

My invention relates in general to coupling devices and more particularly to coupling devices or members for tube fittings.

An object of my invention is the provision of making a turnable connection between the tube and the coupling member whereby the coupling member may be threadably connected to a threaded element without twisting the tube.

Another object of my invention is the provision of making an expansion fit between the coupling member and the tube and of sealing the clearance between the coupling member and the tube whereby the expansion fit in combination with the sealing provision is turnable so that the coupling member may be threadably connected to a threaded element without twisting the tube.

Another object of my invention is the provision of making the sealing means which comprises resilient and substantially noncompressible material subject to compression, whereby the sealing action becomes greater as the fluid pressure increases.

Another object of my invention is the provision of making an expansion fit between the tube and the coupling member and of positioning the sealing means which comprises resilient and substantially non-compressible material between the expansion fit.

Another object of my invention is the provision of blocking extrusion of the sealing means between the tube and the coupling member.

Another object of my invention is the provision of making an expansion fit wherein the expansion fit produces a piston effect between the tube and the coupling member so as to block extrusion of the sealing means between the tube and the coupling member.

Another object of my invention is the provision of locating the sealing ring in the body of the coupling member which has the greatest wall thickness.

Another object of my invention is the provision of locating the sealing means in the hexagonal nut portion of the coupling member.

Another object of my invention is the provision of connecting the tube to the coupling member whereby vibration of the tube is absorbed.

Other objects and a fuller understanding of my invention may be had by referring to the following description and claims, taken in conjunction with the accompanying drawing, in which:

Figure 1:
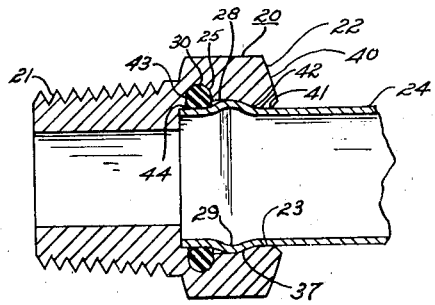
Figure 1 is a longitudinal cross-sectional view of my coupling member embodying the features of my invention.

With reference to Figure 1 of the drawing, my invention is shown as being applied to a coupling member 20 which is adapted to be connected to a tube 24. The left-hand end portion of the coupling member 20 is provided with threads 21 which are usually in the form of pipe threads for engaging a cylinder or other threadable element. The right-hand end of the coupling member 20 comprises a nut portion 22 whereby the coupling member may be turned by a suitable wrench or tool. The coupling member is provided with a counterbore 23 into which the end of the tube 24 is inserted. The tube may be of any suitable material and is further characterized as being outwardly extensible whereby a portion thereof may be expanded into the coupling member after insertion therein to make an internal expansion fit with the coupling member.

Instead of being provided with male threads, the coupling member 20 may be provided with female threads for connection to a fitting element as shown in my copending application, Serial No. 574,467. The right-hand end of the coupling member is provided with an end having a laterally extending surface 40 which meets with the cylindrical wall of the bore to define a tube entrance juncture 41.

The counterbore 23 extends inwardly from the end surface 40 of the coupling and comprises a cylindrical wall to closely receive the tube and enlarged internal wall means to receive an expanded section 29 of the tube and sealing means or ring 30. In Figure 1 of the drawing, which is the preferred embodiment of my invention, the enlarged internal wall means comprises a groove to receive the expanded section 29 of the tube and a groove to receive the sealing ring 30 prior to the insertion of the tube into the counterbore. More specifically, the enlarged internal wall means comprises an annular arcuate wall or end surface 37, an intermediate annular wall 28 which may be cylindrical, and an enlarged internal groove 25 into which the sealing ring 30 is positioned. The annular arcuate wall 37 and the annular wall 28 constitute a groove to receive the expanded section of the tube. The annular arcuate wall surface 37 extends inwardly at its rear or right-hand end and meets with the cylindrical wall of the counterbore and defines therewith a first annular junction 42. The internal groove 25 has an inwardly extending side portion 43 which meets with the cylindrical wall of the counterbore 23 to define a second annular junction 44 substantially blocking escape of the sealing ring 30 along the tube. The side portion 43 of the groove 25 is opposed to the annular arcuate end wall 37. The surfaces of the groove 25 and the end wall 37 meet or merge into the annular surface 28. The enlarged internal wall means defines, in combination with the tube, a chamber to receive the expanded section 29 of the tube and the sealing ring 30. The enlarged internal wall means thus comprises first and second inwardly extending end walls respectively meeting with the cylindrical wall of the counterbore to define therewith first and second annular junctures 42 and 44 longitudinally spaced from each other and inwardly from the tube entrance juncture 41.

Figure 2:
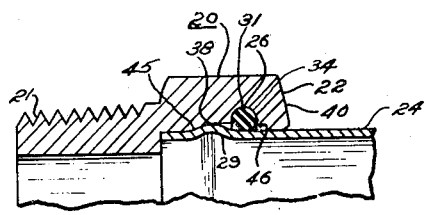
Figure 2 is a modified form of my coupling member.
Figure 3:
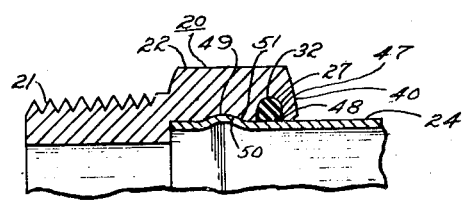
Figure 3 is a further modified form of my coupling member.

The expanded section 29 of the tube may be expanded outwardly by any suitable means and in its expanded position it makes a relatively close engagement with the annular arcuate end wall 37 to produce a turnable expansion fit which provides for relative turning movement between the coupling member 20 and the tube 24, so that the coupling member may be threadably connected to a threaded element without twisting the tube. The engagement between the expanded section 29 of the tube and the annular arcuate end wall 37 resist longitudinal pull of the tube from the coupling member. The Figure 1, as well as the other Figures 2 and 3, is drawn substantially to double scale for a ½-inch tube. The annular cylindrical wall 28 which is the outward radial terminus of the annular arcuate end wall 37 is substantially $\frac{3}{32}$ of an inch greater in diameter than the external diameter of the tube 24.

The groove 25 extends outwardly for a greater radial distance than the outward radial terminus of the annular arcuate end wall 37 to receive the sealing ring 30, which has a greater diameter than the expanded section of the tube.

Although any suitable sealing means may be provided, I preferably employ the standard O ring now available on the market and they may comprise resilient and substantially non-compressible material of a rubber-like nature for making a good sealing engagement between the coupling member and the tube. The sealing ring 30 may be placed in advance of the expansion fit and besides the function of being a seal it also acts to absorb vibration between the tube and the coupling member 20. In addition, it prevents water or moisture from seeping inwardly into the coupling member. The O ring for a one-half inch tube is approximately $\frac{3}{32}$ of an inch in body cross-section and is adapted to engagingly surround the tube to make a good seal therebetween.

Inasmuch as the groove 25 into which the O ring fits, extends radially beyond the expansion fit, a relatively large body of resilient and substantially noncompressible material is available to seal the fluid pressure as well as to absorb vibration, since under the influence of high fluid pressure the O ring will steady or centralize the tube within the coupling member. The O ring 30, upon the application of high positive fluid pressure, cannot extrude rearwardly as it is blocked by the expansion fit, and upon the application of a negative fluid pressure or a vacuum it cannot extrude forwardly as it is blocked by the annular juncture 44 which closely surrounds the tube. The O ring 30 engages the internal groove 25 and the tube 24 and a good initial seal exists between the tube 24 and the coupling member 20 so that for low pressure the sealing means always provides a good seal. As the fluid pressure increases, the ring 30 is compressed by the fluid and produces a greater sealing action with the result that the higher the pressure of the fluid the greater the sealing action.

In Figure 2, the O ring, now identified as 31, is placed on the rearward side of the expanded section 29 of the tube. The groove into which the ring 31 is disposed is identified as 26. The annular wall 28 extends forwardly of the groove 26 and merges into an annular arcuate surface 38 against which the expanded portion of the tube turnably fits. The annular arcuate surface 38 and the annular wall 28 constitute a groove to receive the expanded section of the tube. The annular arcuate surface 38 meets with the cylindrical wall of the bore and defines an annular juncture 45 which is comparable to the annular juncture 42 of Figure 1. The groove 26 has an inwardly extending side wall 34 which meets with the cylindrical wall of the bore 23 and defines a juncture 46 which is comparable to the juncture 44 of Figure 1. The enlarged internal wall means of Figure 2 which defines, in combination with the tube, an annular chamber means, is just the reverse as that shown in Figure 1. The expanded section 29 of the tube makes a relatively close engagement with the annular cylindrical wall 28 to produce a piston effect with the annular cylindrical wall 28, whereby when the tube is moved longitudinally in a rearward direction, relative movement of the expanded portion 29 of the tube within the annular cylindrical wall 28 compresses the sealing ring against the end wall 34 which extends outwardly from the cylindrical wall of the bore 23. The piston effect or relatively close engagement between the expanded portion 29 of the tube and the annular cylindrical wall 28 prevents the sealing means from extrusion therebetween. Also, the cylindrical wall of the bore 23 makes a relatively close fit with the tube whereby the sealing means is prevented from extrusion between the tube and the cylindrical wall of the bore 23. The sealing means is subject to compression and the higher the pressure of the fluid in the tube the greater the sealing action effected by the sealing means. The expansion fit with the sealing means 31 therebetween is such that the coupling member 20 is turnable with reference to the tube 24 so that the coupling member may be threadably connected to a threaded element without twisting the tube. The annular cylindrical wall 28 is substantially $\frac{3}{32}$ of an inch greater in diameter than the external diameter of the tube 24, and thus the expanded portion of the tube when subject to longitudinal movement with reference to the coupling member presses against the lower half of the sealing ring. In this manner, a relatively large body of resilient and substantially non-compressible material is available to absorb vibration over and above that which is directly between the expansion fit. For a one-half inch tube the coupling member for all the figures may be made from a three-quarter inch hex stock and the sealing rings are disposed in the nut portion 22 of the coupling member where the wall thickness is the greatest. The expanded portion 29 of the tube in Figure 2 begins to extend outwardly at a point along the tube near the end wall 34, thereby the clearance between the tube and the cylindrical wall of the bore 23 diminishes as the sealing means is compressed thereby substantially blocking extrusion of the sealing means along the tube. The expanded portion 29 of the tube partially compresses the sealing means whereby a good initial pressure exists between the sealing means and the tube so that for low pressure the sealing means always provides a good seal. As the fluid pressure increases the expanded portion 29 of the tube is caused to compress the sealing means over and above the initial pressure with the result that the higher the pressure of the fluid the greater the sealing action. The expanded portion of the tube does not initially compress the sealing means too tightly and thus the coupling member may be turned with reference to the tube when being threadably connected to a threaded element. In Figure 3 the O ring, now identified as 32, is placed in a groove 27 which is longitudinally spaced rearwardly of the expansion fit. The groove 27 is provided with an end wall 47 which meets with the cylindrical wall of the bore and defines a juncture 48 which is comparable to the juncture 46 in Figure 2. The juncture 48 makes a relatively close fit with the tube and thus prevents escape of the sealing ring 32 from the groove 27. The expansion fit in Figure 3 comprises a groove 49 in which the tube section is expanded. The groove 49 has an inwardly extending side 50 which meets with the cylindrical wall of the bore and defines a juncture 51, which juncture is comparable to the juncture 42 in Figure 1.

In all the figures, the O ring turns relative to the tube or to the groove when the coupling member is turned and thereby provides freedom to the relative turning movement between the tube and the coupling member. In all the figures the internal grooves into which the O rings respectively fit and the grooves into which the tube is expanded are referred to as enlarged internal wall means and defines, in combination with the inserted tube, annular chamber means. In Figure 1, the annular chamber means or the enlarged internal wall means includes the groove 25 to receive the sealing means 30, the annular wall 28 and the annular arcuate end wall 37 constituting a groove into which the tube is expanded; in Figure 2, it includes the groove 26 to receive the sealing means 31, the annular wall 28 and the annular arcuate end wall 38 constituting a groove into which the tube is expanded; and in Figure 3, it includes the groove 27 to receive the sealing means 32 and the groove 49 into which the tube is expanded.

Tests involving the tensile strength of the connection show that the connection is stronger than the tube itself, and furthermore, the higher the fluid pressure the greater the sealing action between the coupling member and the tube.

With this invention couplings may be standardized for different tube sizes, whereby one universal coupling member for each tube will meet all commercial applications. For high temperature work the sealing means may be constructed of a high heat-resisting material.

The annular wall 28 and the groove 49 limit the extent to which the tube may be expanded to prevent rupturing of the tube. The sealing means resiliently holds and supports the tube in the coupling member to the end that the sealing means not only seals the connection against fluid pressure but also absorbs vibration.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A tube coupling member disposed to be turnably and sealingly connected to a tube portion inserted therein, said coupling member having a counterbore extending inwardly from an end thereof, said counterbore having an annular wall to closely receive the tube and enlarged internal wall means to receive an expanded section of the tube portion and sealing means, said enlarged internal wall means having first and second inwardly extending wall portions respectively meeting with the annular wall to define therewith first and second annular junctures longitudinally spaced from each other and inwardly from said end, one of said inwardly extending wall portions being engageable by the expanded section of the tube to produce a turnable expansion fit therewith which provides for relative turning movement between the coupling member and the tube portion, the other of said inwardly extending wall portions and said tube portion being engageable by the sealing means for effecting a sealing engagement therebetween.

2. A tube coupling member disposed to be turnably and sealingly connected to a tube portion inserted therein, said coupling member having a counterbore extending inwardly from an end thereof, said counterbore having an annular wall to closely receive the tube and enlarged internal wall means to receive an expanded section of the tube portion and sealing means, said enlarged internal wall means having a first wall portion and a second wall portion, said first wall portion extending inwardly toward and meeting with the annular wall to define therewith a first annular juncture at a first longitudinal distance inwardly from said end, said second wall portion defining a groove to receive the sealing means and having at least a side portion extending inwardly toward and meeting with the annular wall and defining therewith a second annular juncture at a second longitudinal distance inwardly from said end, said first wall portion being engageable by the expanded section of the tube to produce a turnable expansion fit therewith and provide for relative turning movement between the coupling member and the tube portion, said side portion of the groove and said tube portion being engageable by the sealing means and effecting a sealing engagement therebetween, said groove extending outwardly for a greater radial distance than said first wall portion to receive sealing means having a greater diameter than the expanded section of the tube.

3. A tube coupling member disposed to be turnably and sealingly connected to a tube portion inserted therein, said coupling member having a counterbore extending inwardly from an end thereof, said counterbore having an annular wall to closely receive the tube and enlarged internal wall means to receive an expanded section of the tube portion and sealing means, said enlarged internal wall means having a laterally extending wall portion meeting with the annular wall to define therewith a first annular juncture disposed inwardly from said end, said laterally extending wall portion resisting longitudinal pull of the tube from the coupling member and providing for relative turning movement between the coupling member and the tube portion, said enlarged internal wall means also defining a groove longitudinally disposed from said first juncture and inwardly from said end to receive the sealing means prior to insertion of the tube into the bore.

4. A tube coupling member disposed to be turnably and sealingly connected to a tube portion inserted therein, said coupling member having a counterbore extending inwardly from an end thereof, said counterbore having an annular wall to closely receive the tube and enlarged internal wall means to receive an expanded section of the tube portion and sealing means, said enlarged internal wall means defining an annular arcuate wall surface merging into an internal groove, said annular arcuate wall surface being engageable by an expanded section of the tube portion to provide for relative turning movement between the coupling member and the tube portion, said groove receiving the sealing means prior to the insertion of the tube into the bore, said internal groove having a larger diameter than the annular arcuate wall surface into which the tube is expanded.

5. A tube coupling member disposed to be turnably and sealingly connected to a tube portion inserted therein, said coupling member having a counterbore extending inwardly from an end thereof, said counterbore having an annular wall to closely receive the tube and enlarged internal wall means to receive an expanded section of the tube portion and sealing means, said enlarged internal wall means having an inwardly extending wall portion meeting with the annular wall to define therewith a first annular juncture inwardly of said end, said inwardly extending wall portion being opposed to and longitudinally spaced from the expanded section of the tube portion to receive the sealing means between the said wall portion and the expanded section of the tube, said sealing means being engageable by the expanded section of the tube portion.

6. A tube coupling member disposed to be turnably and sealingly connected to a tube portion inserted therein, said coupling member having a counterbore extending inwardly from an end thereof, said counterbore having an annular wall to closely receive the tube and enlarged internal wall means to receive an expanded section of the tube portion and sealing means, said enlarged internal wall means having a first groove disposed inwardly from said end, said first groove being turnably engageable by the expanded section of the tube and providing for relative turning movement between the coupling member and the tube portion, said enlarged internal wall means also defining a second groove longitudinally disposed from said first groove and inwardly from said end to receive the sealing means prior to insertion of the tube into the counterbore.

GEORGE V. WOODLING.

REFERENCES CITED

The following references are of record in the file of this patent:

UNITED STATES PATENTS

| Number | Name | Date |
|---|---|---|
| 2,233,471 | Clements | Mar. 4, 1941 |
| 1,461,130 | Loughead | July 10, 1923 |
| 310,264 | Emery | Jan. 6, 1885 |
| 2,358,291 | Fentress | Sept. 12, 1944 |
| 1,864,816 | Hamer | June 28, 1932 |
| 786,551 | Doolittle | Apr. 4, 1905 |